United States Patent
Gilbert et al.

(10) Patent No.: US 9,479,279 B2
(45) Date of Patent: Oct. 25, 2016

(54) MULTIPLE PROTOCOL TUNNELING USING TIME DIVISION OPERATIONS

(71) Applicant: Lattice Semiconductor Corporation, Portland, OR (US)

(72) Inventors: Jeffrey M. Gilbert, Cupertino, CA (US); Hoon Choi, Mountain View, CA (US); Chandlee B. Harrell, Los Altos, CA (US); Gyudong Kim, San Jose, CA (US); Young Il Kim, Sunnyvale, CA (US); Ju Hwan Yi, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 253 days.

(21) Appl. No.: 13/915,586

(22) Filed: Jun. 11, 2013

(65) Prior Publication Data

US 2013/0336334 A1 Dec. 19, 2013

Related U.S. Application Data

(60) Provisional application No. 61/659,385, filed on Jun. 13, 2012.

(51) Int. Cl.
*H04J 3/16* (2006.01)
*G06F 13/38* (2006.01)
*G06F 13/42* (2006.01)

(52) U.S. Cl.
CPC .............. *H04J 3/16* (2013.01); *G06F 13/382* (2013.01); *G06F 13/4265* (2013.01)

(58) Field of Classification Search
USPC ......................................................... 370/458
See application file for complete search history.

(56) References Cited

U.S. PATENT DOCUMENTS

| | | | |
|---|---|---|---|
| 6,301,242 B1 | 10/2001 | Lindsay et al. | |
| 2004/0028071 A1* | 2/2004 | Gehring et al. | 370/442 |
| 2004/0057469 A1 | 3/2004 | Nuss et al. | |
| 2007/0091896 A1 | 4/2007 | Liu | |
| 2007/0165578 A1 | 7/2007 | Yee et al. | |
| 2007/0197256 A1* | 8/2007 | Lu et al. | 455/552.1 |
| 2008/0159239 A1 | 7/2008 | Odlyzko et al. | |
| 2009/0161678 A1* | 6/2009 | Huang et al. | 370/395.5 |
| 2009/0248924 A1* | 10/2009 | Melin | 710/63 |
| 2010/0142550 A1* | 6/2010 | Zhang | 370/458 |

FOREIGN PATENT DOCUMENTS

WO WO-2010-043949 4/2010

OTHER PUBLICATIONS

High-Definition Multimedia Interface Specification Version 1.3, HDMI Licensing, LLC, Jun. 22, 2006, 237 pages.

(Continued)

*Primary Examiner* — Yaotang Wang
(74) *Attorney, Agent, or Firm* — Fenwick & West LLP

(57) ABSTRACT

Embodiments of the invention are generally directed to multiple protocol tunneling using time division operations. An embodiment of an apparatus includes an interface for communication with a second apparatus, the interface including a shared communication link; and a multiplexer to multiplex data of each of multiple protocols into time slots for transmission, the protocols including a first protocol. The time slots are distributed among the protocols, where the distribution of the time slots among the protocols includes assigning one or more time slots to the first protocol to enable the data of the first protocol to meet one or more performance requirements for the first protocol.

22 Claims, 12 Drawing Sheets

(56) References Cited

OTHER PUBLICATIONS

International Search Report and Written Opinion of the International Searching Authority dated Sep. 27, 2013, in International Patent Application No. PCT/US2013/045479, 13 pages.

Universal Serial Bus 3.0 Specification (including errata and ECNs through May 1, 2011), Revision 1.0, Hewlett-Packard Company et al., Jun. 6, 2011, 531 pages.

Universal Serial Bus Specification, Revision 2.0, Compaq et al., Apr. 27, 2000, 650 pages.

European Extended Search Report, European Application No. 13803592.8, Nov. 4, 2015, 6 pages.

* cited by examiner

MULTIPLE PROTOCOL TUNNELING USING TIME DIVISION OPERATIONS

CROSS-REFERENCE TO RELATED APPLICATIONS

This application claims the benefit of priority from U.S. Provisional Patent Application No. 61/659,385 filed Jun. 13, 2012, which is incorporated herein by reference in its entirety.

TECHNICAL FIELD

Embodiments of the invention generally relate to the field of electronic data communications, and, more particularly, to multiple protocol tunneling using time division operations.

BACKGROUND

Communications between electronic devices may be called up on to carry data of multiple different protocols as newer protocols are developed and legacy protocols continue to be supported. For example, consumer electronic devices may include a mixture of new and old devices. Data may be tunneled over a particular communication channel or channels, wherein tunneling refers to a method by which data of a first protocol is carried via a second protocol.

In such circumstances, there may be certain protocol performance requirements that must be met, where the restrictions may include, for example, a required response latency for a certain data protocol. Such requirements may create obstacles to a tunneling operation for a protocol if the operation causes the data to fail to meet the necessary performance requirements.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
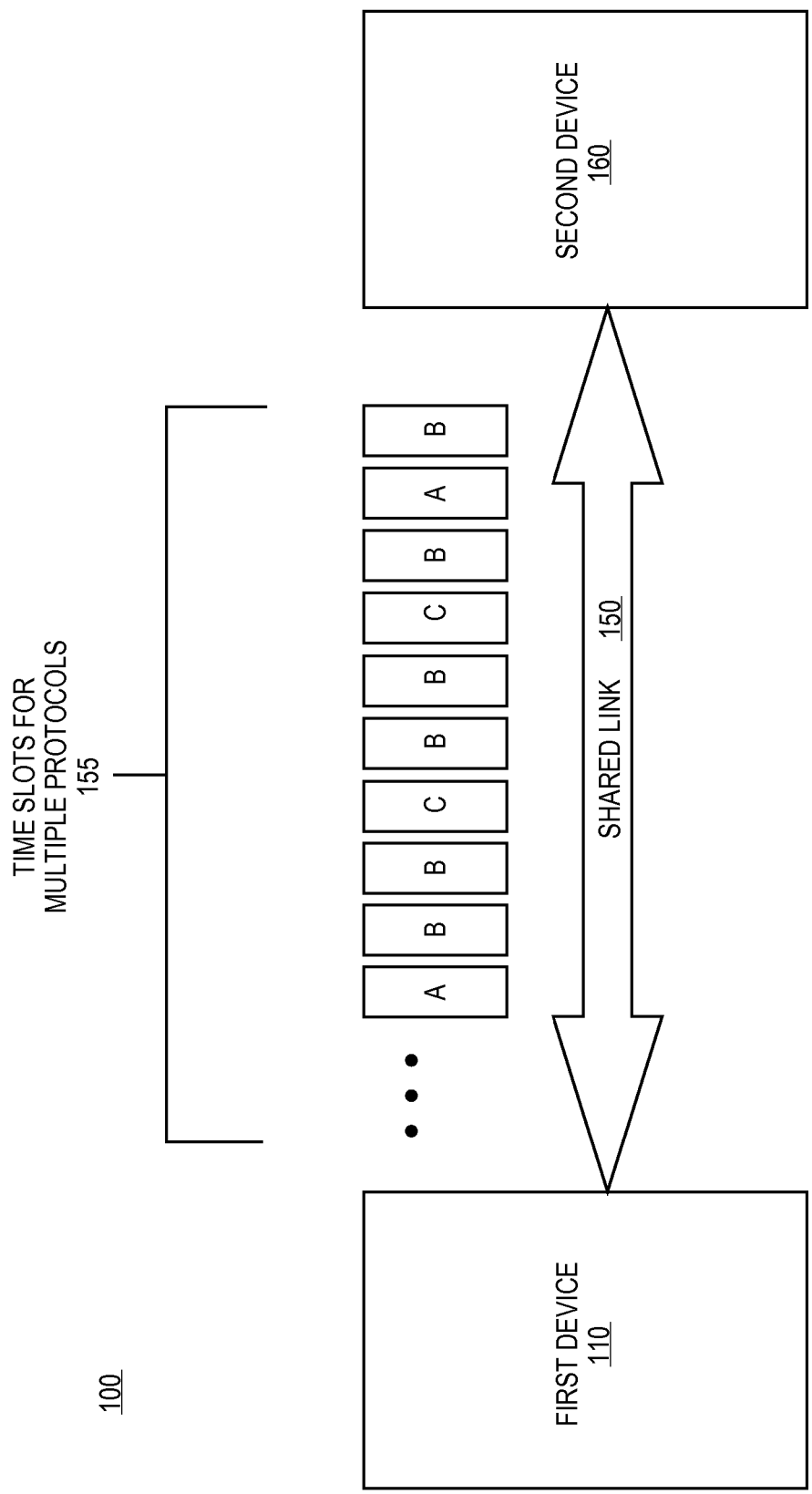
FIG. 1 illustrates a system including an embodiment of multiple protocol tunneling over a shared time division multiplex link.

Embodiments of the invention are generally directed to multiple protocol tunneling using time division operations.

In a first aspect of the invention, an embodiment of an apparatus includes an interface for communication with a second apparatus, the interface including a shared communication link; and a multiplexer to multiplex data of each of multiple protocols into time slots for transmission, the protocols including a first protocol. The time slots are allocated among the protocols, where the allocation of the time slots includes assigning one or more time slots to the first protocol to enable the data of the first protocol to meet one or more performance requirements for the first protocol.

In a second aspect of the invention, a method includes receiving data traffic for multiple protocols, including a first protocol, for transmission from a first device to a second device; dividing the data traffic for each protocol into portions that are no greater than an established number of bits for a time slot; inserting the portions of data for each of the protocols into time slots, wherein the time slots are allocated to each of the protocols for time division multiplexing of the data for each protocol; and transmitting data of each of the protocols over a shared communication link. The first protocol includes one or more performance requirements, and the allocation of the time slots within each set of time periods to each protocol is based at least in part on ensuring that operations of the first protocol meet the one or more performance requirements for the first protocol.

DETAILED DESCRIPTION

Embodiments of the invention are generally directed to multiple protocol tunneling using time division operations.

Communication protocols commonly include certain performance requirements in connection with transmission over a link, including latency requirements. For example, USB™ (Universal Serial Bus) protocol requires relatively tight response latency for reads and acknowledgements (ACKs) for USB 1.0, USB 1.1, and USB 2.0, which be referred to herein collectively as USB 1.0/1.1/2.0, including Low Speed, Full Speed, and High Speed operation, which may be referred to herein collectively as LS/FS/HS operations. The USB 1.0/1.1/2.0 specification requires responses from devices within approximately 1 µs (microsecond). The USB specification indicates that hubs should have a maximum latency of 75 ns (nanoseconds) to be USB compliant.

However, many communication links, including high-speed communication links, produce latencies for responses that are greater than 75 ns, especially when operations include operations such as multiplexing multiple traffic streams on a packet-by-packet basis, because the worst case latency of a packet can exceed the length of the previous packet.

In some embodiments, an apparatus, system, or process provides for reducing redundancy and latency for delivering data in multiple protocols, including one or more protocols with performance requirements, using time division multiplexing of data. Performance requirements may include, but are not limited to, latency requirements, bandwidth requirements, and Quality of Service (QoS) requirements. In some embodiments, an apparatus, system, or process further provides for synchronizing time slots between a source and a sink, and for detection of and recovery from a loss of synchronization. In some embodiments, an apparatus, system, or process provides for handling signaling robustly, such as providing for delivering USB bus signaling (such as RESET, CONNECT, IDLE, RESUME, SUSPEND) robustly. As used herein, a "mandated performance protocol" refers to a protocol subject to one or more performance requirements. Mandated performance protocols include a "low latency protocol", referring to a communication protocol that requires a relatively low latency link, such as, for example, USB protocol. Similarly, "low latency data traffic" refers to data traffic for a low latency protocol. Examples provided herein regarding low latency protocols also apply to protocols with different or additional performance requirements.

A possible implementation that reduces latency time for data traffic provides a separate pair of wires that are reserved for low latency data traffic (or other data traffic subject to performance requirements), such as USB data traffic. However, this alternative is not wire-efficient and may not be possible in an environment in which there are a limited number of wires or electrical contacts, for example, in a mobile device utilizing a connector having a small number of connections.

An additional alternative implementation over a higher latency link includes the provision of fake responses that allow for additional time under a low latency protocol, such as transmitting fake ACKS before the receiving end has an opportunity to return a true acknowledgement, using STALL or not ready codes to extend available time, or providing other codes that extend allowed latency time beyond normal latency limitations. However, such operations may have an impact on interoperability of a device, the performance of the device, or both.

A further alternative is to provide a communication link above the "link layer", and thus to bridge transactions and not the link itself. This alternative is utilized by, for example, USB over IP (Internet Protocol) and related protocols. However, such operations require significant software changes to host software, and cannot be used as an add-in where the new link plugs into an existing USB host on one side and a device on the other.

Thus, it is challenging to directly tunnel low latency data traffic, such as USB data packets. Further, this task is particularly difficult when the communication link that is used for tunneling is not significantly faster than the low latency communication link requirements (such as, for example, a 600 Mbps (megabits per second) link for tunneling of a 480 Mbps USB 2.0 communication link) because the latency caused by other data packets that are carried over the communication link can be high or above a pre-defined threshold.

In some embodiments, an apparatus, system, and method provide for multiple protocol tunneling over a shared time division multiplex (TDM) data link. In some embodiments, time slots for the data link are allocated to protocols as required to meet latency requirements. As used here, allocation includes one or more of establishing a number of time slots in a set of time periods and establishing positions of time slots in a set of time periods. Allocation is not limited to establishing a fixed number of time slots or fixed positions of time slots in each set of time periods. In some embodiments, the shared protocol tunneling includes tunneling of mandated performance protocol data traffic, such as low latency protocol data traffic, over the shared TDM link, wherein the TDM link may transmit data at a higher rate and thus provide an increased bandwidth above the requirements of the low latency protocol. In some embodiments, the multiple protocol tunneling allows for the transmission of multiple data types over the shared data link. In some embodiments, an apparatus, system, or method provides for tunneling multiple low latency data links, such as multiple USB links. In some embodiments, multiple USB links may be tunneled concurrently, where such tunneling may potentially in same or different directions.

In some embodiments, tunneling is provided for mandated performance data traffic utilizing scheduled TDMA (Time Division Multiple Access) over a communication link that is faster than the mandated performance data traffic. For example, an embodiment may provide for tunneling of USB 1.0, 1.1, and 2.0 data traffic, including USB 2.0 Low Speed (1.5 Mbps), Full Speed (12 Mbps), and High Speed (480 Mbps), over a communication link with other data traffic, the communication link being faster than the USB data requirements.

In some embodiments, utilizing the TDMA approach, TDMA allocates the available link bandwidth for a link into time slots, including allocation of sufficient slots to data traffic that has one or more performance requirements according to the restrictions of the respective protocol, such as USB 1.0/1.1/2.0, in order to ensure sufficient bandwidth with short enough latency to meet the performance requirements for the data traffic, such as, for example, the latency requirements provided in the USB 1.0, 1.1, or 2.0 specification. In some embodiments, scheduling of transmissions over a link for tunneling of data traffic is established in a prioritized fashion such that the traffic with one or more performance requirements, such as USB 1.0/1.1/2.0, is guaranteed sufficient bandwidth and sufficiently low latency to meet their requirements. In some embodiments, such tunneling further meets requirements for faster communications in more advanced communication links by providing packet-based communication for such faster communications, such as, for example, USB 3.0 communications.

FIG. 1 illustrates a system including an embodiment of multiple protocol tunneling over a shared time division multiplex link. In this illustration, a system 100 includes a first device 110 coupled with a second device 160 via a shared communication link 150. The link 150 may vary in structure depending on the embodiment, as further discussed below. In some embodiments, the first device 110 and second device 160 provide for time division multiplexing of data of multiple protocols to allow for transmission of the data of each protocol over the link 150, wherein the width (number of bits) of the time slots and the allocation of the time slots (including one or more of establishing numbers of time slots and establishing positions of time slots) among the plurality of protocols is established to allow conformance with latency requirements for one or more protocols.

In this illustration, the time slots for the multiple protocols are distributed such that, for example, a particular protocol (designated as "B" in FIG. 1) is provided with sufficient bandwidth to meet a latency threshold. As illustrated, the time slots are arranged from left to right in time order. As illustrated, a first protocol ("A") may be reserved certain time slots, such as in this example the first time slot in each set of eight time periods, where a set of time periods refers to a sequence of a certain number of time periods. A particular protocol ("B") with a latency requirement is provided with sufficient bandwidth to meet the latency requirements, which in this example includes allocation of the second, third, fifth, sixth, and eighth time slots of each set of time periods, with the remaining time slots being allocated to a third protocol ("C"). However, this is a particular example, and embodiments are not limited to a particular choice in the allocation of time slots among the data traffic of multiple different protocols.

Figure 2:
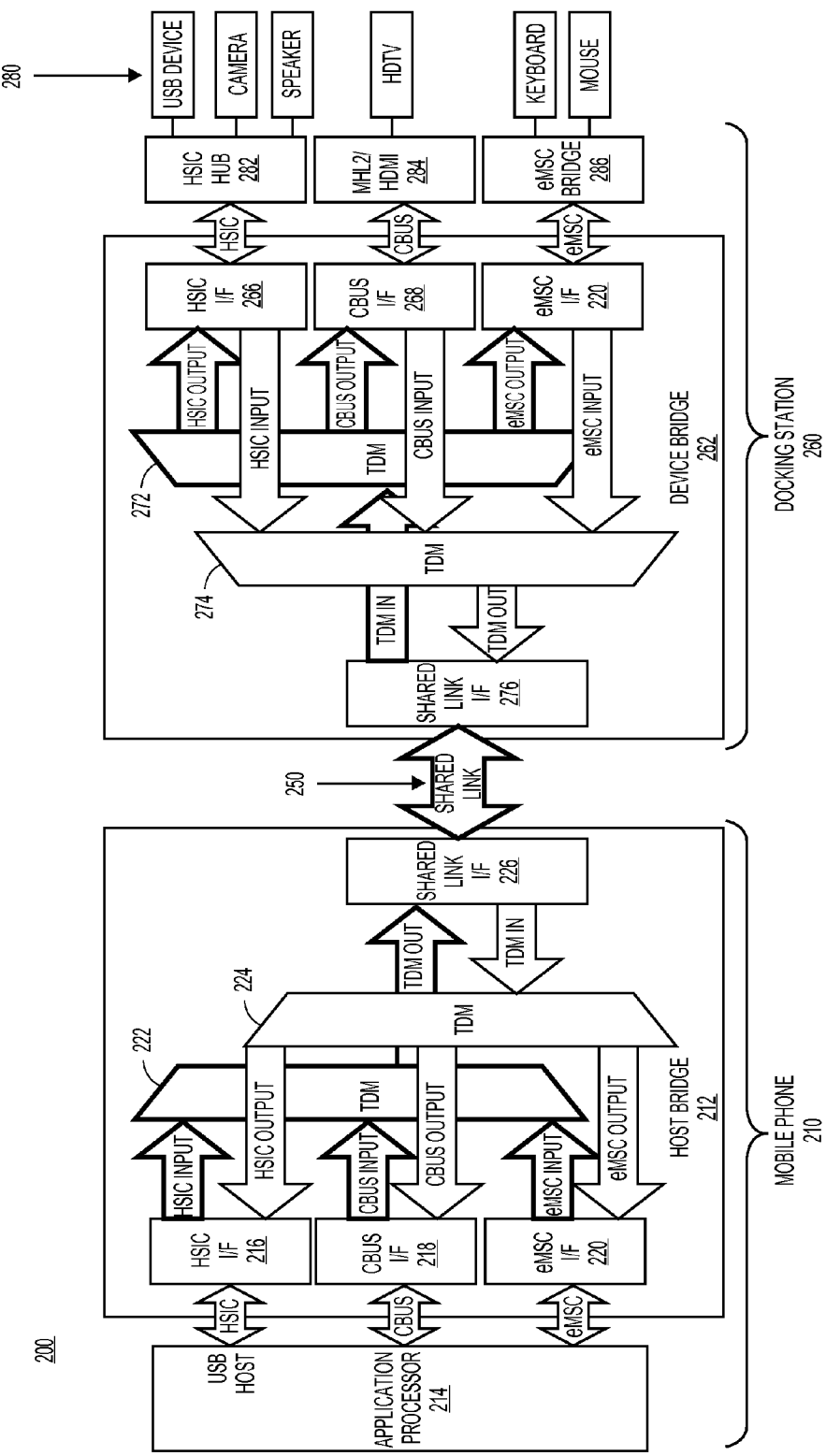
FIG. 2 illustrates a system including a particular embodiment of multiple protocol tunneling over a shared time division multiplex link.

FIG. 2 illustrates a system including a particular embodiment of multiple protocol tunneling over a shared time division multiplex link. In this illustration, a first device, the first device being a mobile phone 210, and a second device, the second device being a docking station 260 (which may be referred to as a dock), are connected though a shared link 250. The mobile phone 210 can access one or more devices 280 connected to docking station. In a particular embodiment, the link for the shared link 250 is the MHL™ (Mobile High-Definition Link) 3.0 side-band channel referred to as eCBUS. However, embodiments are not limited to the link being a certain interface.

In the example provided in FIG. 2, the protocol traffic that is delivered over a shared link include the data traffic of the following protocols:

(a) HSIC (High-Speed Inter-Chip interface), HSIC being the electrical sub-specification of USB 2.0 for chip-to-chip interconnect;

(b) CBUS (Control Bus), the legacy side-band channel of the MHL link; and (c) eMSC (enhanced MHL Sideband Channel), which is allocated timeslots on the eCBUS for carrying new packets defined for MHL-specific communication for MHL 3.0.

For example, devices 280 coupled with the dock 260 include one or more of a USB drive, a camera, or a speaker connected via an HSIC hub 272, a high-definition television connected via an MHL or HDMI™ (High-Definition Multimedia Interface) hub, or a keyboard or mouse connected via an eMSC bridge 276) over the shared link 250. However, embodiments are not limited to the number and type of protocols in this example, and may include, for example more or fewer protocols, multiple instances of the same protocols, and other protocols of different or similar types.

As illustrated in FIG. 2, the mobile phone 210 includes an application processor (USB host) 214 coupled with a host bridge 212, the host bridge 212 including an HSIC interface 216, a CBUS interface 218, and an eMSC interface 220. The interfaces 216-220 are coupled with a time division multiplexer 222 to provide TDM data out to a shared link interface 226, and are coupled with a time division multiplexer 224 for TDM data in from the shared link interface 226. The docking station 260 includes a device bridge 262 coupled with the HSIC hub 282, the MHL/HDMI bridge 284, and the eMSC bridge 286, the device bridge 262 including an HSIC interface 266, a CBUS interface 268, and an eMSC interface 270. The interfaces 266-270 are coupled with a time division multiplexer 274 to provide TDM data out to a shared link interface 276, and are coupled with a time division multiplexer 272 for TDM data in from the shared link interface 276.

Figure 2A:
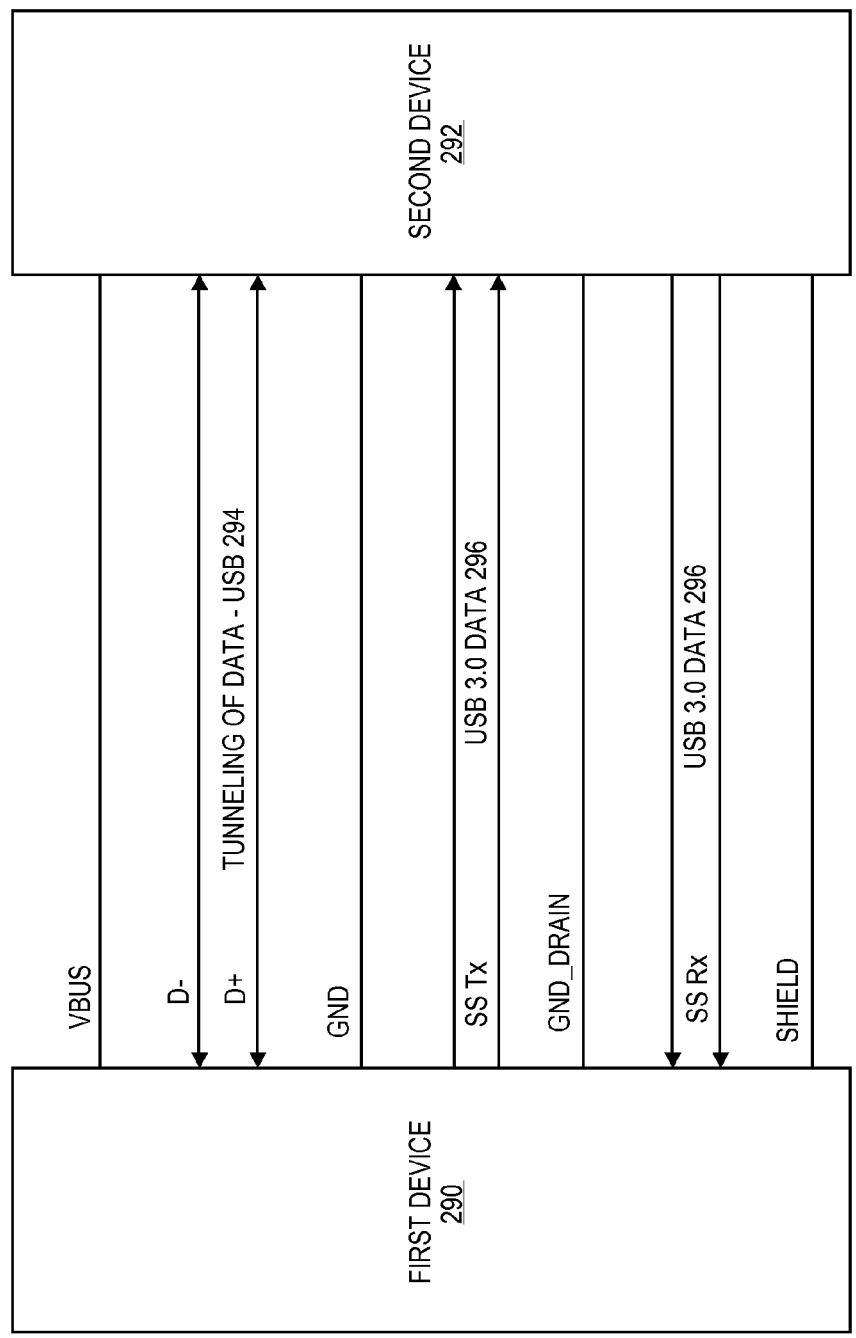
FIG. 2A is an illustration of certain communication links according to an embodiment.

FIG. 2A is an illustration of certain communication links according to an embodiment. FIG. 2A illustrates USB 3.0 connections between a first device 290 and a second device 292. In some embodiments, an apparatus, system, or method applies TDMA and scheduling of time slots for tunneling data traffic with one or more performance requirements, such as USB data 294 that otherwise would be transferred over the half-duplex, bi-directional USB data pair, where such wires or signals are designated as D- and D+ and may be referred to as the USB 2.0 differential pair. USB 3.0 is expanded from previous versions of USB to include an additional unidirectional wire pair for data transmission and an additional unidirectional wire pair for data reception, which may respectively be referred to as the SuperSpeed (SS) transmitter differential pair (SS Tx) and the SuperSpeed receiver differential pair (SS Rx). When transmitting USB 3.0 data traffic 296, there remains the need to carry the data traffic in the legacy USB 1.0/1.1/2.0 data pair in addition to the two new unidirectional pairs added in USB 3.0. As illustrated, the USB 3.0 connection may further include power (VBUS), a ground for power return (GND), a ground for signal return (GND_DRAIN), and a shield in a shell connection.

In some embodiments, the TDMA scheduling may be at varying granularity (which may also be referred to as the width of the time slot), such as being at the bit, nibble (four bits), byte (eight bits), or larger granularity, with the granularity being chosen such that the maximum queuing delay imposed by other traffic on the traffic with one or more performance requirements (delay such as the delay imposed by non USB 1.0/1.1/2.0 data traffic on the USB 1.0/1.1/2.0 data traffic) is maintained at a sufficiently low level. In an example, the granularity for MHL 3.0 may be eight bits for High Speed traffic, and as low as one bit for Low Speed traffic. However, embodiments are not limited to these particular granularity choices. In some embodiments, the TDMA scheduling with a smaller multiplexer interval for lower speed rates is utilized to limit latency of operation. In some embodiments, an apparatus, system, or method may utilize different encoding for the different rates.

In some embodiments, TDMA operation includes scheduling of time slots to provide sufficient bandwidth with traffic with performance requirements, such as for low latency data traffic. In some embodiments, the scheduling of time slots (with additional time slots allocated to low latency data traffic) and the size of time slots (with a fewer number of bits for each time slot being allocated for slower traffic) are utilized to provide a low latency tunnel with guaranteed bandwidth to enable seamless and effective tunneling of low latency data traffic, including, for example, USB traffic. In some embodiments, if a communication link is fast enough and packets are small enough, then an apparatus, system, or method may further utilize prioritized data packet transmission for certain data traffic, such as, for example, prioritized packets with USB data being assigned highest priority.

Figure 3:
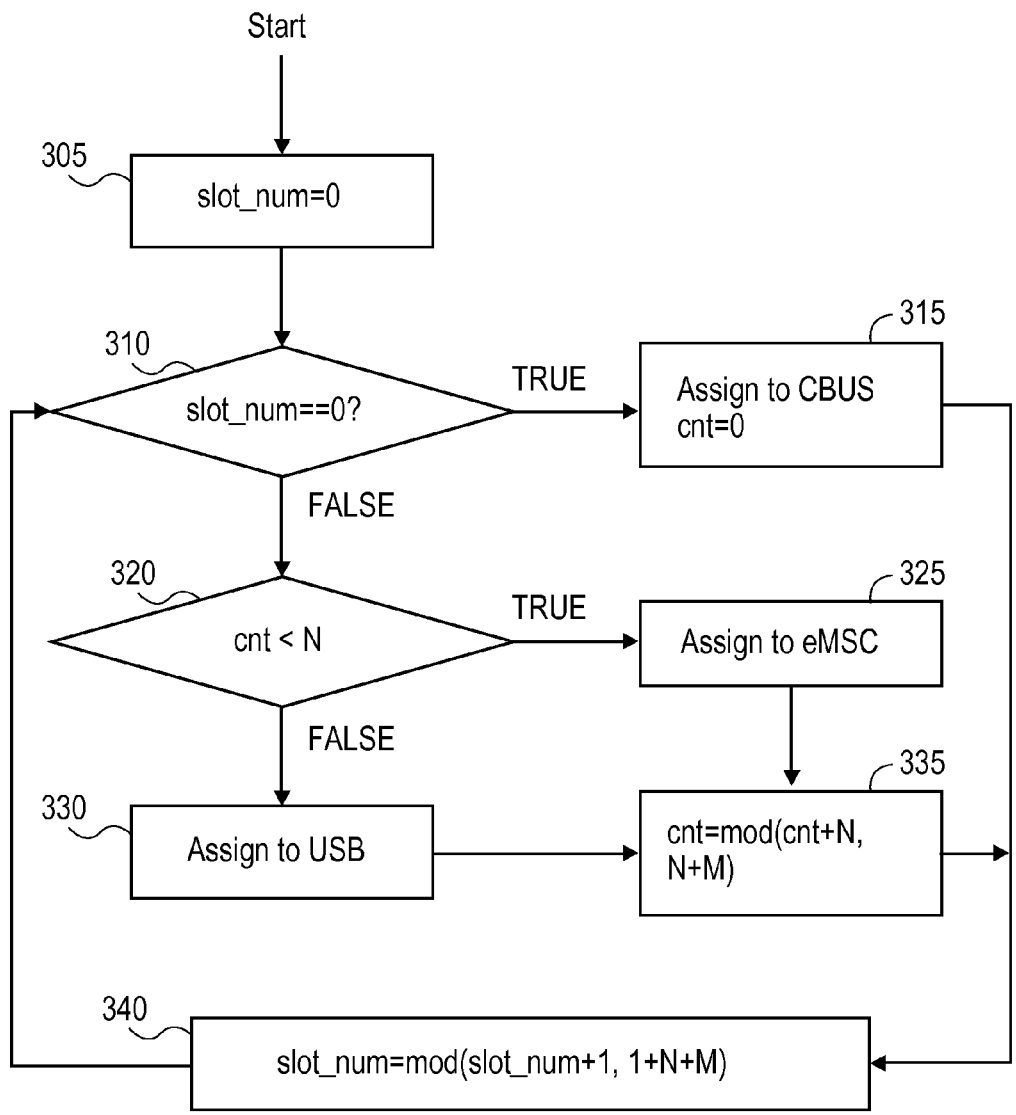
FIG. 3 is a flow chart to illustrate distribution of time slots in an embodiment of multiple protocol tunneling.

FIG. 3 is a flow chart to illustrate distribution of time slots in an embodiment of multiple protocol tunneling. In time division multiplexing of a shared link, the time domain is divided into several time slots of fixed length (in one example, slots of eight bits in length). FIG. 3 illustrates an embodiment of a slot allocation algorithm. In this illustration, the function mod(A,B) represents a modular operation. The result is the remainder of division of A by B, where, for example, mod(10, 8)=10 mod 8=2. Through such operation, time slots are evenly distributed to minimize latency.

In the illustrated process, a process for distribution of time slots for multiple protocol tunneling includes setting the slot number to zero 305. Continuing the process, if the slot number is zero 310, the slot is assigned to CBUS, with the count=0, and the slot number is incremented, set to mod (slot_num+1, 1+N+M) 340, wherein M is the number of slots in each set of time periods to be assigned to USB and N is the number of slots in each set of time periods to be assigned to the remaining protocol, eMSC. Returning to decision 310, if the slot number is not equal to zero, there is a determination whether the count is less than N 320, and, if so, the slot is assigned to eMSC, and, if not, the slot is assigned to USB 330. Subsequent to the assignment of the slot, the count is incremented by N, where the count=mod (cnt+N, N+M).

Figure 4:
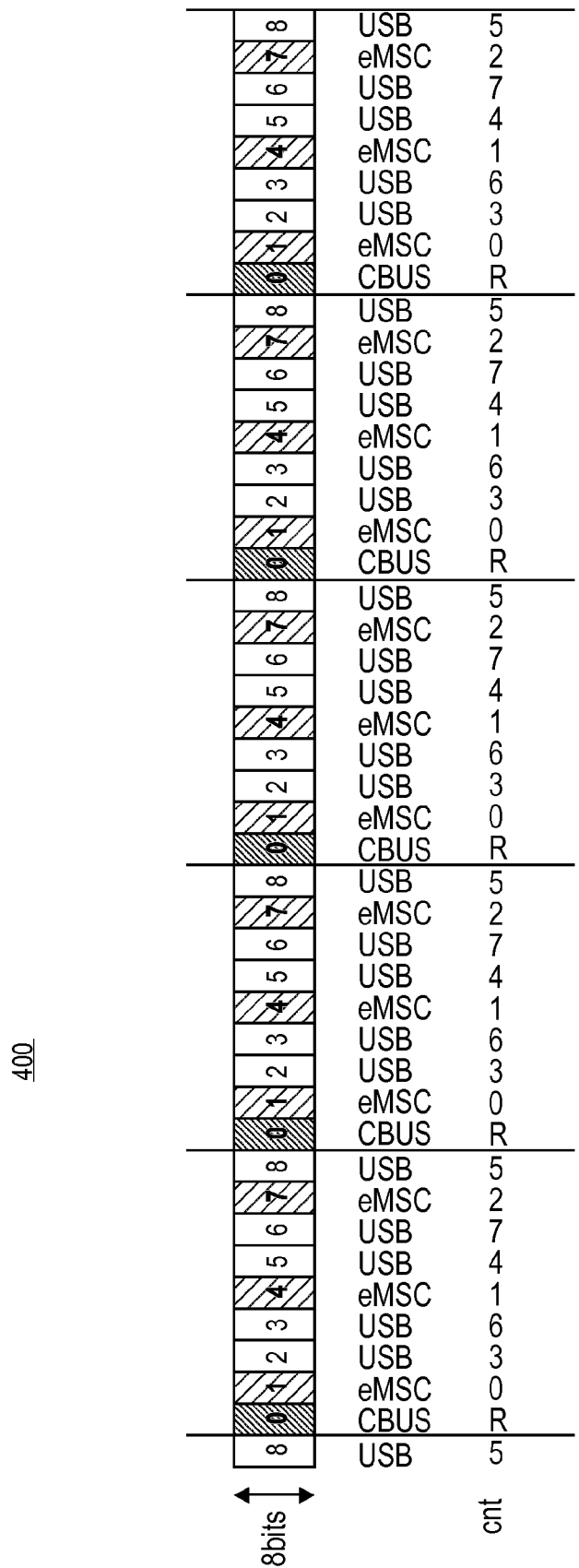
FIG. 4 is an illustration of time slot allocation in a particular implementation of multiple protocol tunneling.

FIG. 4 is an illustration of time slot allocation in a particular implementation of multiple protocol tunneling. In this illustration, an example of slot allocation is provided in which of a total of nine time slots in each set of time periods, a determination is made to allocate CBUS one time slot, eMSC three time slots, and USB five time slots. In this example, the algorithm illustrated in FIG. 3 may be utilized to distribute the time slots to the protocols, wherein N (the number of time slots allocated to eMSC)=3, and M (the number of time slots allocated to USB)=5. As illustrated in FIG. 4, the time slots 400 are evenly allocated based on such requirements, with a maximum of two consecutive time slots of any protocol, such that in this example of each set of nine time periods the allocation of time slots to each protocol is:

CBUS is allocated: Time slot #0
eMSC is allocated: Time slots #1, #4, #7
USB is allocated: Time slots #2, #3, #5, #6, #8

While FIG. 4 illustrates an example in which each set of time periods includes nine time slots, and wherein the allocation of number and position of each time slot in each set of time periods is the same, embodiments are not limited to fixed allocations of time slots, and may include, for example, the size of each set of time periods, the number of time slots allocated for each protocol, and the position of each time slot varying between sets of time periods.

Figure 5:
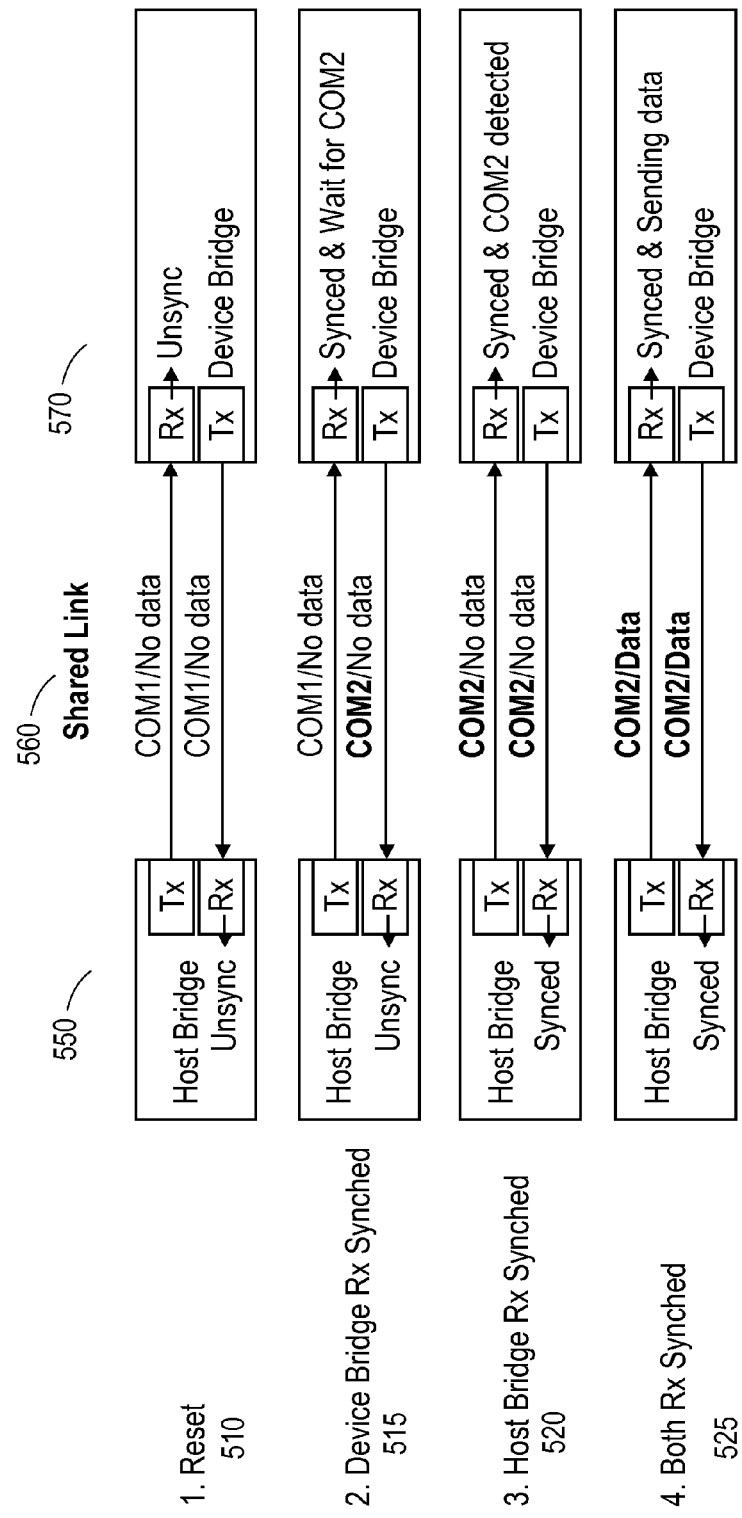
FIG. 5 is an illustration of TDM synchronization at system start up according to an embodiment.

FIG. 5 is an illustration of TDM synchronization at system start up according to an embodiment. In some embodiments, TDM slot synchronization occurs in in training or recovery period. In some embodiments, both sides of a bridge simultaneously start synchronization process, illustrated in FIG. 5 as a host bridge 550 coupled via a shared link 560 with a device bridge 570. In some embodiments, synchronization includes:

(1) On reset 510, each endpoint sends a first special symbol (for example, COM1) periodically in a particular time slot location (such as, for example, in a CBUS slot) for the other end to synchronize. Other time slots (such as USB and eMSC) are filled by IDLE characters indicating that there is no data to send. In this example, the special symbols may include COM1 and COM2 symbols defined in MHL to deliver sync status notification to the other end.

(2) If a device bridge is synchronized first 515, the device bridge starts sending a second special character (for example, COM2 instead of COM1) to notify that the device bridge is synchronized.

(3) When the host bridge is synchronized 520, the host bridge also starts sending the second special character (COM2), and thus at this point both ends are sending the COM2 character.

(4) When both ends are synchronized 525, the USB host and device commence normal data transfer. If there is CBUS data to send, the CBUS data slots are filled with such data. Otherwise, the COM2 character is filled in CBUS slots. Further, eMSC and USB time slots are filled by eMSC and USB data, respectively, during this time.

Figure 6:
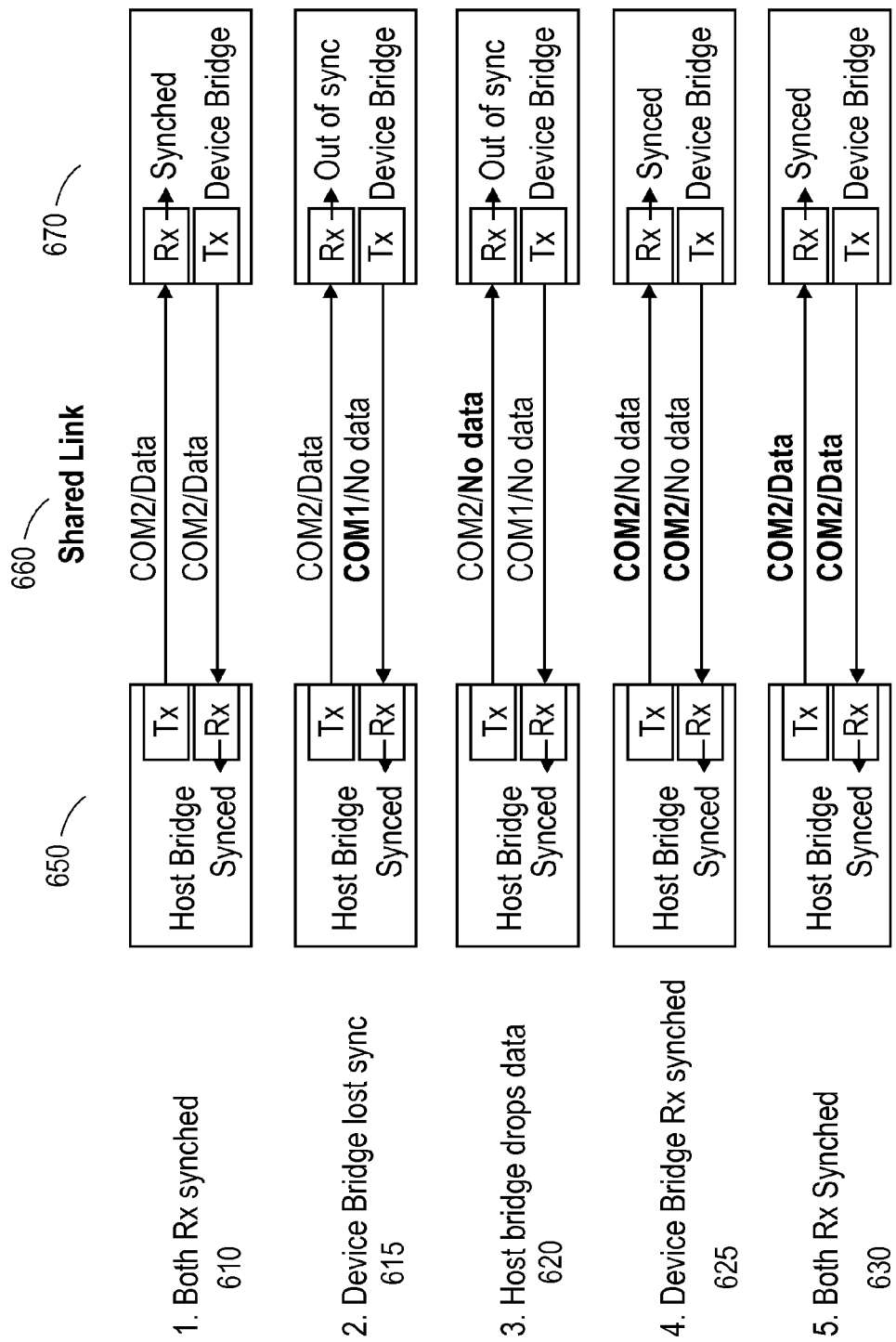
FIG. 6 is an illustration of TDM synchronization loss detection and recovery according to an embodiment.

FIG. 6 is an illustration of TDM synchronization loss detection and recovery according to an embodiment. In some embodiments, bridge devices, illustrated in FIG. 6 as a host bridge 650 coupled via a shared link 660 with a device bridge 670, provide TDM synchronization loss detection and recovery, utilizing detection of special symbols, such as the COM1 and COM2 symbols to deliver synchronization status notification to the other end. In some embodiments, a process for synchronization loss detection and recovery for communication between bridge devices includes:

(1) In normal operation in which both bridge devices are synchronized 610, with both bridge devices sending special symbol to indicate synchronization, such as data including a COM2 symbol being present in the CBUS time slot and data being present in USB and eMSC time slots.

(2) Either bridge device can detect synchronization loss by the other bridge by checking what special symbol is being transmitted, such as which of COM1 or COM2 symbols appears in the CBUS slot. If a bridge device loses synchronization due to byte misalignment or bit error, the bridge device starts sending COM1 in the CBUS time slot and filling IDLE characters in other time slots 615.

(3) When a host bridge detects COM1 character in the CBUS time slot, it continues sending COM2 symbols in the CBUS slot and drops data in other slots to assist in the recovery of the device bridge 620.

(4) A device bridge successfully recovers synchronization and sends COM2 in CBUS slot 625.

(5) When both bridge devices are synchronized, the system resumes normal data transfer 630.

Figure 7:
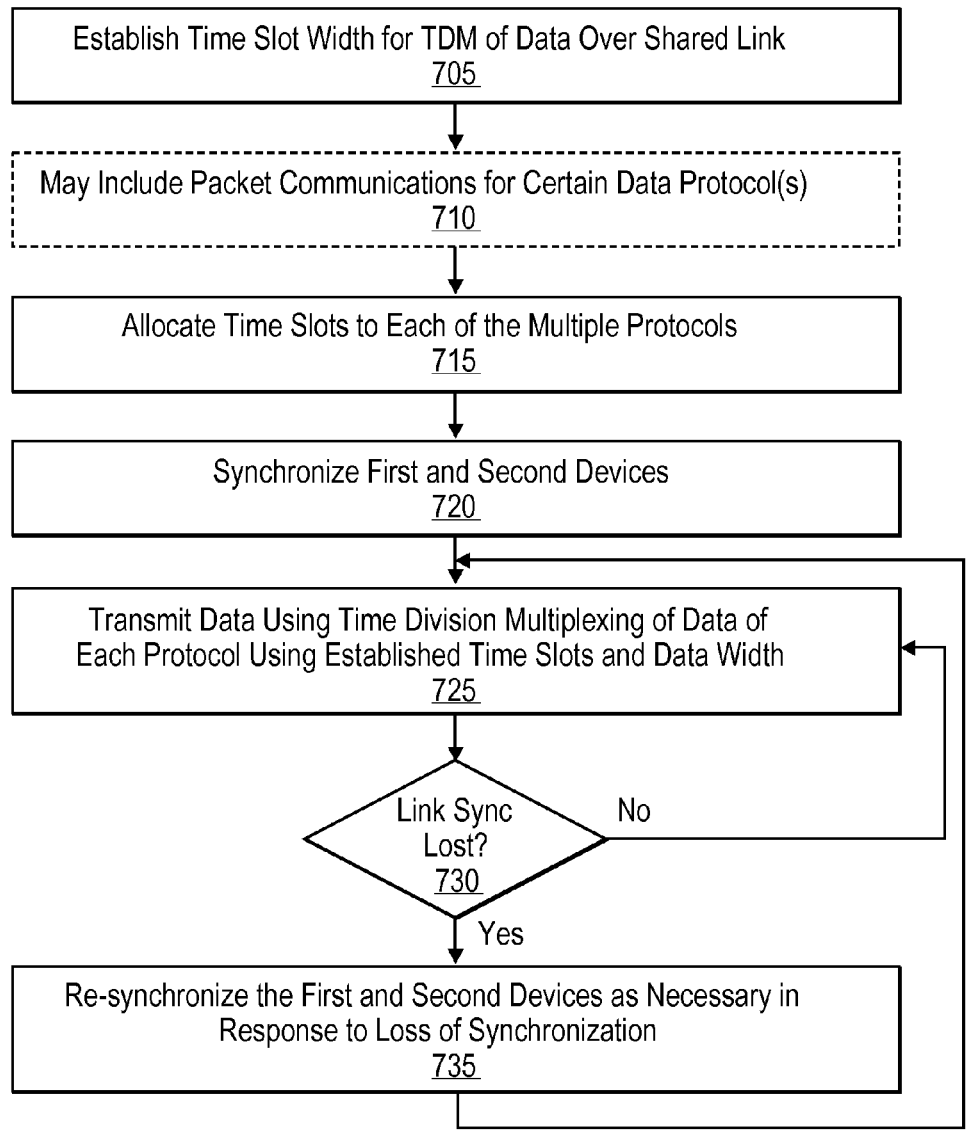
FIG. 7 is a flow chart to illustrate a process for multi-protocol data tunneling over a shared communication link.

FIG. 7 is a flow chart to illustrate a process for multi-protocol data tunneling over a shared communication link. In some embodiments, in order to provide transmission of certain multiple data protocols over a communication link between a first device and a second device, communication factors are established, including a time slot width being established for time division multiplexing of data over a communication link 705, where the width is determined based on the latency requirement for at least one data protocol of the multiple data protocols and the maximum queuing delay imposed by other data traffic on the shared link. In some embodiments, the data slot width being established to be small enough that latency requirements can be met in light of maximum queuing delay imposed by other data traffic on the shared link. In some embodiments, the factors may further include allowing packet communications for one or more protocols 710, such as, for example, allowing packet communications for USB 3.0 data transmission, while USB 1.0/1.1/2.0 is transmitted using time division multiplexing.

In some embodiments, the establishment of communication factors further includes allocating TDM time slots to each of the plurality of protocols 715. In some embodiments, the allocation of time slots is based at least in part on providing sufficient bandwidth to one or more protocols to maintain compliance with one or more latency requirements. For example, the allocation of time slots includes allocating sufficient time slots to maintain latency requirements for a low latency protocol such as USB 1.0/1.1/2.0.

In some embodiments, communication operations commence with the synchronization of the first and the second device 720, such as illustrated in FIG. 5, and the transmission of data using time division multiplexing of data of each protocol 725, where the transmission utilizes the established time slot width and time slot application. In some embodiments, if link synchronization is lost 730 the process further includes re-synchronizing the first and second devices as necessary in response to the loss of synchronization 735, such as illustrated in FIG. 6.

While the examples provided herein are directed generally to USB, embodiments are not limited to USB and may be applied to other protocols, and in particular protocols having with tight latency requirements, including but not limited to:

(a) IEEE (Institute of Electrical and Electronics Engineers) 1394 High Speed Serial Bus (referred to as "Firewire");

(b) I²C serial bus—For example, I²C for the DDC (Display Data Channel) of HDMI™ (High-Definition Multimedia Interface) and other standards. This application may be especially useful for transmission with a single cable or optical link.

(c) PCIe (Peripheral Component Interconnect Express)—An implementation of tunneling of PCIe data traffic may include tunneling at a data link layer. Further, tunneling may be provided at the transaction layer as well depending on the underlying link, although the latency requirements are relaxed in this case.

(d) Low-level wireless protocols utilizing ACKs.

(e) Other low-latency links that may be handled over a higher speed link.

In an example related to USB, USB 3.0 retains the half-duplex pair used in USB 1.0/1.1/2.0 for Low Speed, Full Speed, and High Speed operation, but adds additional unidirectional high speed transmit and high speed receive links for the SuperSpeed (SS, with speed of 5 Gbps (gigabits per second)) operation. In USB 3.0, the latency constraints on the additional high speed transmit and high speed receive lines are somewhat relaxed compared to those for the half-duplex 1.0/1.1/2.0 pair. In USB 3.0, there are thus three separate data pipes (each sent with a separate differential pair):

(a) Pair of conductors for USB LS/FS/HS (half duplex, bidirectional, 480 Mbps maximum, more latency sensitive);

(b) Pair of conductors for USB SuperSpeed transmitter (unidirectional, higher speed, less latency sensitive); and (c) Pair of conductors for USB SuperSpeed receiver (unidirectional, higher speed, less latency sensitive).

Thus, this totals three pairs, or six wires, for bi-directional communication for USB. In USB 3.0 operation, there are also other pins for power and GND (ground).

In some embodiments, multiple pairs of wires, such as the three pairs of wires provided for USB 3.0, are combined into a single bi-directional link. In an implementation, USB 3.0 SuperSpeed traffic may be combined with the USB LS/FS/HS traffic. In some embodiments, if the USB traffic is the only traffic to be carried, the data in the full duplex SuperSpeed lanes and the half-duplex Low Speed/Full Speed/High Speed lanes can be combined in a time-slotted, TDMA, or other time scheduled manner. If there is other additional traffic (such as, for example, Ethernet/IP data, video, MHL, CBUS, etc.), this and the USB traffic may be combined into a single bi-directional data stream. In some embodiments, the combination of the low latency traffic and other traffic may be implemented in different ways including:

(a) Time-slotted TDMA combination of each data protocol, such as scheduled combination of the USB SuperSpeed, USB LS/FS/HS, and other (video, Ethernet etc.) data. In this matter, all traffic may be provided with sufficiently low latency to maintain protocol compliance and provide sufficient service. However, unless the TDMA is very dynamic, it may be difficult to obtain good utilization of the available bandwidth if the traffic on the streams varies over time given fixed allocations.

(b) Time-slotted TDMA combination of the low latency data traffic, such as, for example, scheduled combination of the USB Low Speed/Full Speed/High Speed data traffic (in a first grouping) together with the combined USB SuperSpeed and other traffic (such as video, Ethernet, etc.) data traffic (in a second grouping). In this matter, there is a 2-way scheduled access between the USB Low Speed/Full Speed/High Speed traffic and all other traffic. In some embodiments, the scheduled access may be established as a fine-grained level (bit, nibble, byte, # of bytes) to maintain low latency.

Figure 8:
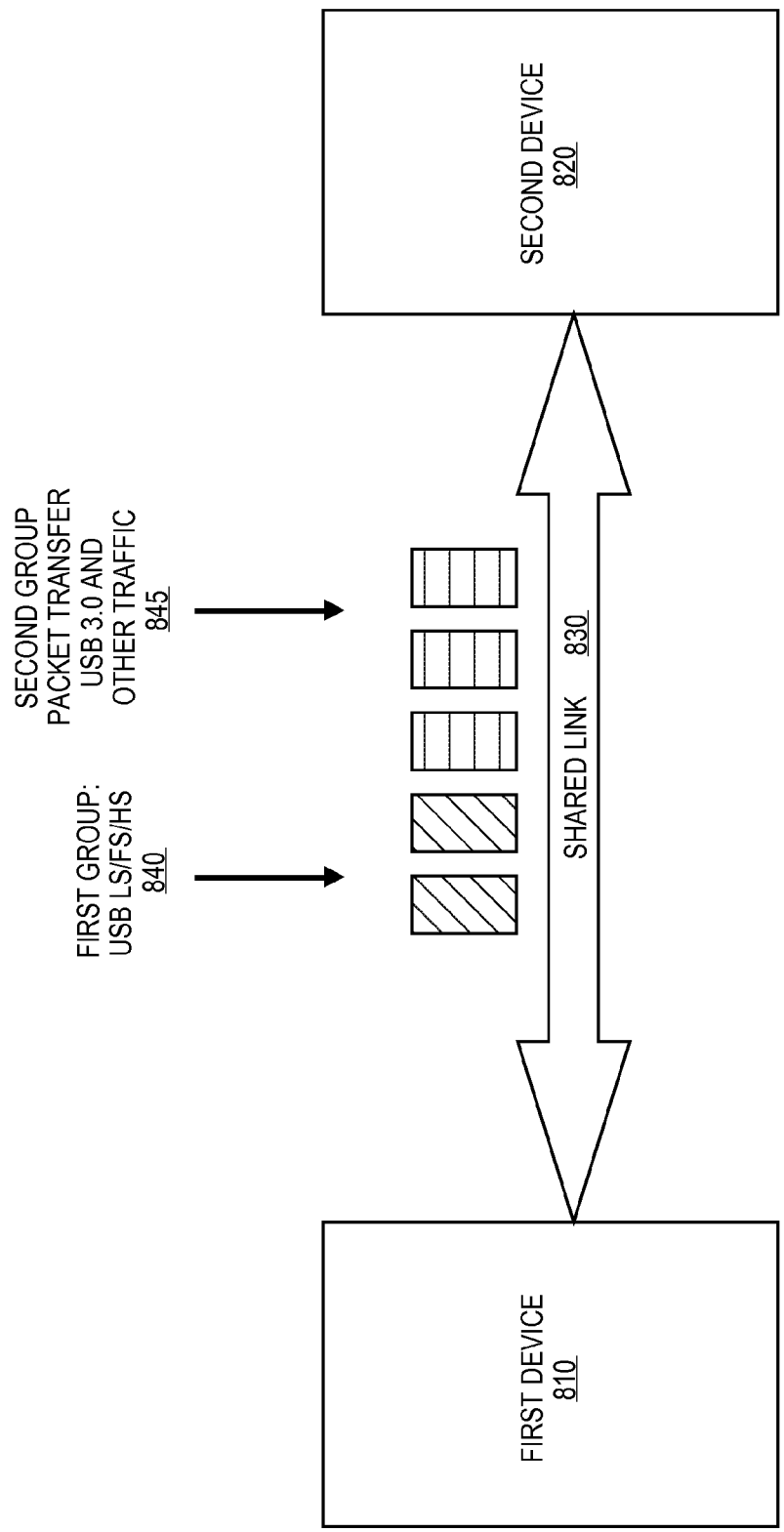
FIG. 8 illustrates a time-slotted combination of data traffic according to an embodiment.

FIG. 8 illustrates a time-slotted combination of data traffic according to an embodiment. In this illustration, a first device 810 is coupled with a second device 820 via a shared link 830 for the transmission of data by time division multiplexing is multiple time slots. In some embodiments, the time slots being allocated between a first group 840 and a second group 845. In some embodiments, the first group 840 provides tunneling of data for, for example, USB LS/FS/HS data, while the second group 845 includes data that has been providing in packet communication and separated into time slots for transmission on the shared link, such as USB 3.0 SS and other data traffic.

In some embodiments, allocation of bandwidth to data traffic with one or more performance requirements may be maintained at the protocol traffic speed, such as USB Low Speed/Full Speed/High Speed traffic being kept to 480 Mbps (the protocol traffic speed for High Speed data), while the rest of the data traffic can be allocated the excess bandwidth, which may include applying different access allocation methods within the excess bandwidth. In some embodiments, the other data traffic, the USB SS and other (such as video, Ethernet, etc.) data traffic, may be combined on a packet-by-packet basis. By combining the other traffic on a packet-by-packet basis, greater flexibility and adaptability to different traffic mixes can be obtained.

In some embodiments, data communication, including tunneling of low latency data traffic, may be carried over a single bi-directional link. Embodiments may vary in the choice of the communication medium, where options for the bi-directional link may include:

(a) Optical link—In some embodiments, a link may include unidirectional optical fibers or one bi-directional fiber with a splitter at each end of the fiber;

(b) Full duplex communication of over a single wire or pair of wires—In some embodiments, techniques for providing communication may include: (i) Full duplex signaling such as that used in 10G-BaseT or 1G-BaseT Ethernet can be used to send the full duplex signals over a single pair of wires in a differential manner, or (ii) A full duplex signaling such as Clock On CBUS can be used to carry the full duplex data signals over a single wire, or differential pair, while supplying a video clock to be used with a video link. In this manner, the signaling may be carried over one or two wires, with power and ground being carried on another two wires. In an example, a cable with the full capability of USB 3.0 may be implemented using only four wires, and thus may be implemented using a standard USB 1.0/1.1/2.0 connector having four pins (type A or B connector) or five pins (Mini-USB or Micro-USB). Thus, backwards compatible modes may be used to connect to a legacy device that only supports legacy modes, such as USB 1.0/1.1/2.0, over this connector.

(c) Full duplex over two unidirectional differential pairs of wires—In some embodiments, if power is not required, a 4-wire cable may be used to carry the full functionality of the multiple data protocols. In some embodiments, if power is required, techniques like those used in Power-Over-Ethernet (PoE) can be used to carry the power and data in the 4 wires. This can thus be used over existing USB 1/1.1/2 connectors as above. Backwards compatible modes can be used to connect to a legacy device only supporting legacy USB 1.0/1.1/2.0 over this connector.

(d) Full duplex over two unidirectional single-ended wires—In some embodiments, two wires may be used for the full duplex data. In this manner, the data communication may be combined with two wires for power. For example, a USB 1.0/1.1/2.0 connector may be used in an implementation. In some embodiments, additional shielding may be provided in the connector to make ensure signal integrity and sufficiently low EMI (electro-magnetic interference).

(e) Full duplex over a single single-ended wire—In some embodiments, a single single-ended wire may be utilized. For example, an implementation may include carrying only the low latency data traffic, such as LS/FS/HS USB traffic, on a single-ended full duplex wire, while carrying the higher data rate traffic on other wires, such as carrying SS USB 3.0 traffic the two additional differential pairs of USB 3.0, using one of the other transports noted above (for example, transmission on two unidirectional differential pairs, or on one full duplex bidirectional pair).

In some embodiments, tunneling of data traffic may be implemented in a system to carry data traffic with one or more performance requirements, such as low latency data traffic, by tunneling MHL data. For example, the described technique may be used to carry USB traffic over MHL data traffic. Implementations may include:

(a) In one implementation, the USB 1.0/1.1/2.0 LS/FS/HS traffic may be combined with the MHL CBUS (control bus) data, with other data traffic, including MHL video data, being transmitted over the MHL CBUS line. In this manner, the data traffic may be carried over an MHL 1.0 or MHL 2.0 CBUS run at higher speeds, and which includes TDMA and/or scheduled access.

In some embodiments, the data traffic may be carried over a modified CBUS using a "Clock-on-CBUS" signaling technique that delivers, along with the A/V link clock, a bi-directional data pipe that can scale beyond 480 Mbps. However, if less than 480 Mbps can be delivered, FS or LS traffic can still be bridged. As discussed above, CBUS and other traffic that does not have as tight round trip latency constraints can be combined in a packet-by-packet basis or in a TDMA fashion.

(b) In another implementation, the USB 1.0/1.1/2.0 and USB 3.0 traffic may be combined with MHL CBUS traffic as provided in option (a) in the control bus lane, which thus is separate from the one or more video data lanes.

(c) In another implementation, the USB 1.0/1.1/2.0 and CBUS traffic may be combined with the video data traffic, all in a single common bi-directional data stream. (In addition, the USB 3.0 traffic from the two SS lanes can also be so combined.) This may be implemented using a standard USB 1.0/1.1/2.0 4-pin or 5-pin connector, while still including power and ground pins.

In some embodiments, legacy modes, such as legacy MHL modes, may detect if this new mode is not supported and fall back to old modes if needed.

In some embodiments, an apparatus, system, or method include processes for managing a TDMA stream including tunneling of low latency data traffic. In some embodiments, an apparatus, system, or method includes provisions for synchronization of the TDMA streams. In some embodiments, "comma characters" or special characters not belonging to the normal data channel coding can be used to separate data streams by identifying time slots between the time slotted sources. This may be utilized to determine initial synchronization, and further to determine if synchronization is lost.

In some cases, one or more of a plurality of TDMA streams may not have channel coding that incorporates the higher redundancy and supplies "Comma" characters. In this case, loss of synchronization is not determined until another TDMA stream that includes the Comma characters is transmitted. The USB 1.0/1.1/2.0 packet headers can also be read to confirm synchronization and re-establish if needed.

In some embodiments, a transmission in the reverse of data traffic, if available, may be utilized to provide assurance that synchronization is maintained. For example, because USB 1.0/1.1/2.0 data traffic is half-duplex, if such data traffic is tunneled over a full-duplex link, the direction that is not carrying USB 1.0/1.1/2.0 data traffic could carry reverse-direction synchronization information to ensure that the two sides remained synchronized. This reverse direction may also be used to carry additional data besides the USB LS/FS/HS data.

In some embodiments, an apparatus, system, or method includes a process for TDMA slot assignment that provides for sufficient bandwidth for low latency data traffic. In an example, the placement of the non-USB 1.0/1.1/2.0 traffic slots vs. the USB 1.0/1.1/2.0 traffic slots determines worst case latency. In some embodiments, a leaky bucket model can determine worst case latency.

In some embodiments, an apparatus, system, or method provides for compatibly reporting topology of data traffic, such as compatible reporting USB topology. In some embodiments, reporting may be made as single or multiple hubs.

In an example, if the link latency including worst-case multiplexing/de-multiplexing delay is very small relative to the USB hub latency threshold, then there is the opportunity for the USB tunnel latency to fit in standard system design budgets for USB designs. If the link latency including worst-case multiplexing delay is greater than the USB hub latency threshold but does fit in standard system design budgets for USB, then the USB tunnel can report as an embedded USB hub such that devices will see the latency in line with expectations based on the topology. If link/cable length or other issues require a latency that is longer than the specification threshold for a single USB hub, the USB tunnel can report as a cascade of two or more USB hubs to again present a latency in the bounds of requirements.

In some embodiments, round trip time estimation or a priori knowledge can be used to determine if the latency will be more than a single hop and if so how long and this can be used to determine how many hubs to report.

Figure 8A:
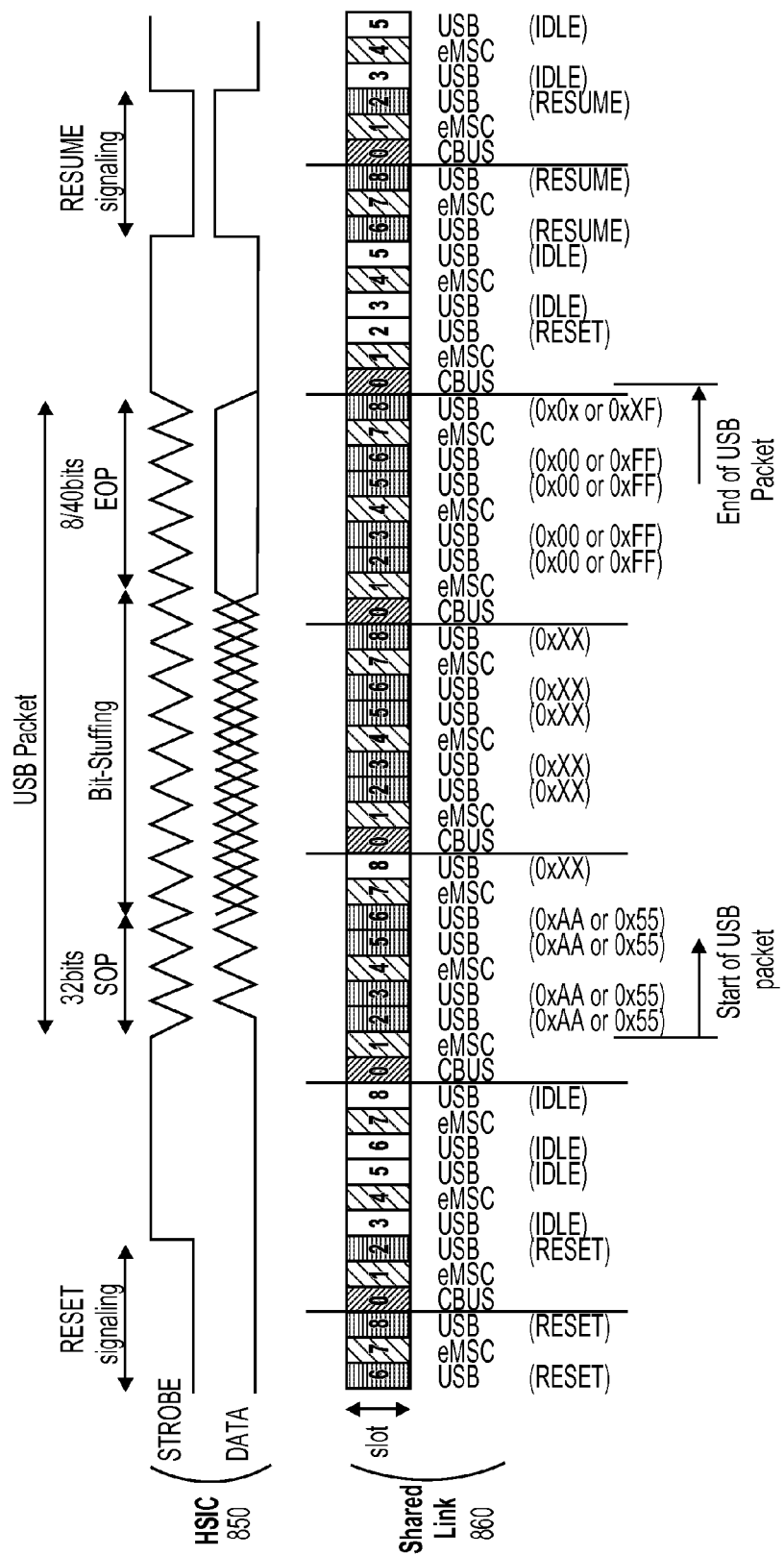
FIG. 8A illustrates mapping of a packet and event to a TDM link according to a embodiment.

FIG. 8A illustrates mapping of a packet and event to a TDM link according to a embodiment. FIG. 8A illustrates a specific implementation of mapping a USB event to TDM time slots. In some embodiments, an apparatus, system, or method provides for minimizing or controlling latency and redundancy for transferring a data packet such as a USB packet, where evenly distributed TDM slots reduce latency of USB packet delivery. In some embodiments, a USB packet data (or other data packet) is transferred over TDM slots without any additional redundancy, where a process includes parallelizing a bit stream of a USB line to 8-bit (or other time slot width) while retaining NRZI (Non Return to Zero, Inverted) encoding and bit-stuffing. In some embodiments, packet boundary information is embedded in USB packet over eCBUS, and if there is no USB packet, IDLE symbols are stuffed in USB slots.

In FIG. 8A, the USB HSIC signaling 850 is illustrated, including a strobe signal and data signal. Also illustrated is the shared link 850 for transmission of the USB data via TDM time slots, where the time slots follow the allocation example illustrated in FIG. 4. As shown, the USB time slots are initially filled with RESET values until the strobe edge is detected, and the USB time slots are then filled with IDLE values. This continues until the start of packet (SOP), following by the data in the bit stuffing period, followed by the end of packet (EOP). Following the EOP, the USB time slots resume with IDLE values until a next USB event (for example, a USB packet or RESUME signaling) is detected.

Figure 9:
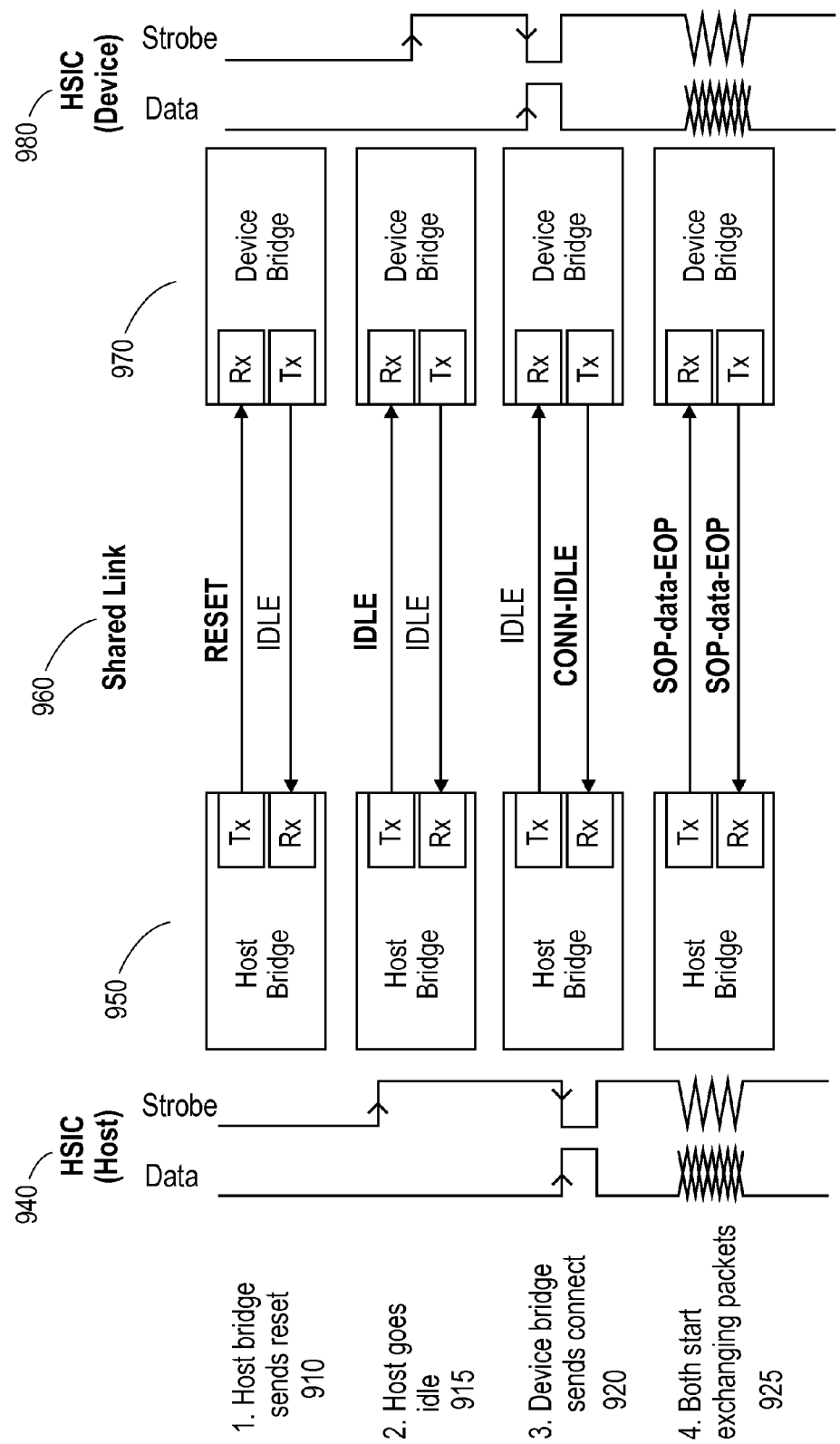
FIG. 9 is an illustration of bus status signaling for a protocol according to an embodiment.

FIG. 9 is an illustration of bus status signaling for a protocol according to an embodiment. In some embodiments, an apparatus, system, or method provides for delivering signals, such as USB (HSIC) bus status signaling, robustly. In some embodiments, an apparatus, system, or method allows for delivering HSIC bus status signaling even in lossy channels. In some embodiments, a bridge continues to send special symbol codes for the HSIC bus in a certain status. As illustrated in FIG. 9, a host bridge 950 is coupled to a device bridge 970 via a shared link 960, where the host bridge 950 is coupled with the HSIC host bus (data and strobe values 940), and wherein the device bride 970 is coupled with the HSIC device bus (data and strobe values 980).

There are five HSIC bus statuses (IDLE, CONNECT, RESUME, SUSPEND, RESET), where a bus status or change in bus status is indicated by a level of the HSIC bus signal (Data and Strobe). In some embodiments, an HSIC initialization sequence includes:

(1) During operation the host bridge 950 detects RESET bus signaling at host-side HSIC bus 940, and in response fills RESET symbols in the USB time slots 910. When the device bridge 970 receives RESET symbols, the device bridge mimics RESET signaling at the device-side HSIC bus 980.

(2) When the host bridge 950 detects IDLE bus signaling at host-side HSIC bus 940, the host bridge fills IDLE symbols in the USB time slots 915. When the device bridge 970 receives the IDLE symbols, the device bridge 970 mimics IDLE signaling at device-side HSIC bus 980.

(3) Upon the USB device asserting CONNECT bus signaling, the device bridge 970 sends CONNECT symbols in the USB time slots 920. In response to receiving the CONNECT, host mimics CONNECT signaling at host-side HSIC bus 980.

(4) The USB host (214 in FIG. 2) connected to the host bridge 950 detects CONNECT bus signaling and starts the enumeration process by exchanging USB packets 925. Host bridge 950 and device bridge 970 operate by tunneling USB packets, as illustrated in FIG. 8.

Figure 10:
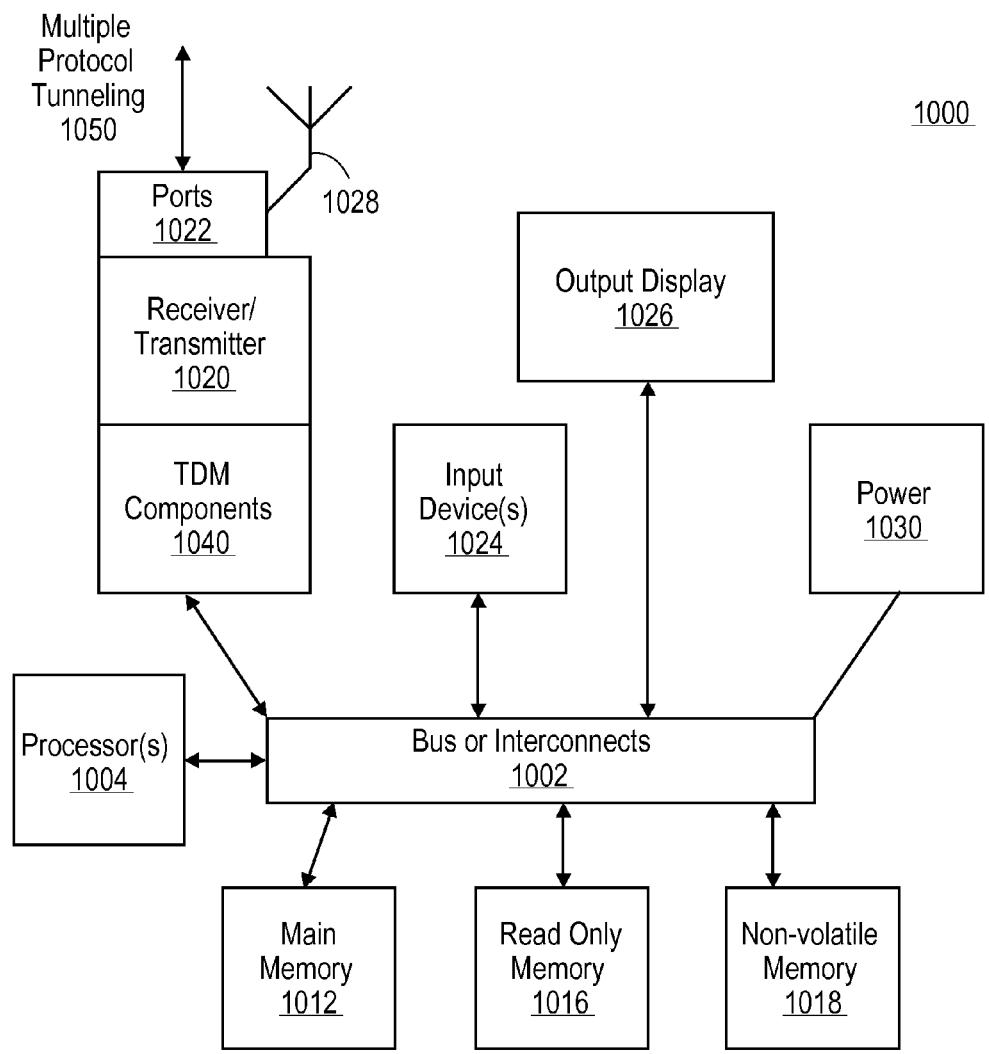
FIG. 10 is an illustration of an electronic device or system including data tunneling according to an embodiment.

FIG. 10 is an illustration of an electronic device or system including data tunneling according to an embodiment. In some embodiments, the apparatus or system utilizes the tunneling process to transmit USB signals. However, embodiments are not limited to USB signaling, and may include the transfer of any data protocol via tunneling.

In some embodiments, an apparatus or system 1000 (referred to here generally as an apparatus) comprises an interconnect or crossbar 1002 or other communication means for transmission of data. In some embodiments, the apparatus 1000 includes time division multiplexing components 1040, such as illustrated in FIG. 2. One or more transmitters or receivers 1020 may be coupled to the TDM components 1040 for transmission and reception of data, including multiple protocol tunneling 1050. In some embodiments, the receivers or transmitters 1020 may include one or more ports 1022 for the connection of other apparatuses, and may include one or more antennas 1028 for the broadcast of radio signals.

The apparatus 1000 of FIG. 10 may further include the following elements or components:

The apparatus 1000 may include a processing means such as one or more processors 1004 coupled with the interconnect 1002 for processing information. The processors 1004 may comprise one or more physical processors and may contain one or more logical processors.

The interconnect 1002 is illustrated as a single interconnect for simplicity, but may represent multiple different interconnects or buses and the component connections to such interconnects may vary. The interconnect 1002 shown in FIG. 10 is an abstraction that represents any one or more separate physical buses, point-to-point connections, or both connected by appropriate bridges, adapters, or controllers.

In some embodiments, the apparatus 1000 further comprises a random access memory (RAM) or other dynamic storage device or element as a main memory 1012 for storing information and instructions to be executed by the processors 1004. In some embodiments, main memory may include active storage of applications. In some embodiments, memory of the apparatus may include certain registers or other special purpose memory.

The apparatus 1000 also may comprise a read only memory (ROM) 1016 or other static storage device for storing static information and instructions for the processors 1004. The apparatus 1000 may include one or more non-volatile memory elements 1018 for the storage of certain elements, including, for example, flash memory and a hard disk or solid-state drive.

The apparatus 1000 may include one or more input devices 1024, which may include one or more of a keyboard, mouse, touch pad, voice command recognition, gesture recognition, sensors or monitors (including sensors or monitors providing power and performance data), or other device for providing an input to the apparatus 1000.

The apparatus 1000 may also be coupled via the interconnect 1002 to an output display 1026. In some embodiments, the display 1026 may include a liquid crystal display (LCD) or any other display technology, for displaying information or content to a user. In some environments, the display 1026 may include a touch-screen that is also utilized as at least a part of an input device. In some environments, the display 1026 may be or may include an audio device, such as a speaker for providing audio information.

The apparatus 1000 may also comprise a power device or apparatus 1030, which may comprise a power supply, a battery, a solar cell, a fuel cell, or other system or device for providing or generating power. The power provided by the power device or system 1030 may be distributed as required to elements of the apparatus 1000.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable non-transitory storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

In some embodiments, an apparatus includes: an interface for communication with a second apparatus, the interface including a shared communication link; and a multiplexer to multiplex data of each of a plurality of protocols into time slots for transmission, the plurality of protocols including a first protocol. In some embodiments, the time slots are allocated among the plurality of protocols, allocation of the time slots among the plurality of protocols including assigning one or more time slots to the first protocol to enable the data of the first protocol to meet one or more performance requirements for the first protocol.

In some embodiments, the one or more performance requirements include one or more of a latency requirement, a bandwidth requirement, and a Quality of Service (QoS) requirement.

In some embodiments, allocation of the time slots includes allocation of a number of time slots for each protocol.

In some embodiments, allocation of the time slots includes allocation of a position of one more time slots.

In some embodiments, a number of bits assigned to each of the time slots is based at least in part on the one or more performance requirements and a maximum queuing delay imposed by other data traffic on the shared communication link. In some embodiments, the number of bits is one of a single bit for traffic of a first speed, a nibble for traffic of a second speed, or a byte for traffic of a third speed, where the first speed is slower than the second and third speeds and the third speed is faster than the first and second speeds.

In some embodiments, the shared communication link of the apparatus is a bidirectional link including one or more wires or optical fibers. In some embodiments, the bi-directional link may include:

(a) An optical link, such as unidirectional optical fibers or one bi-directional fiber with a splitter at each end of the fiber;

(b) Full duplex communication of over a single wire or pair of wires;

(c) Full duplex over two unidirectional differential pairs of wires;

(d) Full duplex over two unidirectional single-ended wires; or (e) Full duplex over a single single-ended wire In some embodiments, the first protocol is USB™ (Universal Serial Bus) protocol.

In some embodiments, the plurality of protocols includes USB and the shared communication link includes one or more conductors of a USB compatible connector.

In some embodiments, the plurality of protocols includes USB 3.0 and the shared communication link includes one or more conductors of a USB 2.0 compatible connector.

In some embodiments, the allocation of time slots includes allocation of time slots for packet communication in a first group and time slots including a first protocol in a second group. In some embodiments, the first group includes USB 3.0 packet communication and wherein the first protocol includes one or more of USB Low Speed, Full Speed, and High Speed traffic.

In some embodiments, the first protocol is protocol for a $I^2C$ serial bus.

In some embodiments, the first protocol is protocol for PCIe (Peripheral Component Interconnect Express).

In some embodiments, the apparatus is enumerated as one more nodes in addition to nodes that are physically present.

In some embodiments, a method includes: receiving data traffic for a plurality of protocols, including a first protocol, for transmission from a first device to a second device; dividing the data traffic for each protocol into portions that are no greater than an established number of bits for a time slot; inserting the portions of data for each of the plurality of protocols into time slots, wherein the time slots are allocated to each of the plurality of protocols for time division multiplexing of the data for each of the plurality of protocols; and transmitting data of each of the plurality of protocols over a shared communication link. In some embodiments, the first protocol includes one or more performance requirements, and wherein the allocation of the time slots within each of a plurality of sets of time periods to each protocol is based at least in part on ensuring that operations of the first protocol meet the one or more performance requirements for the first protocol.

In some embodiments, the one or more performance requirements include one or more of a latency requirement, a bandwidth requirement, and a Quality of Service (QoS) requirement.

In some embodiments, the allocation of time slots includes allocation of a number of time slots for each protocol.

In some embodiments, the allocation of time slots includes allocation of a position of one or more time slots.

In some embodiments, a number of bits assigned to each of the time slots is determined at least in part based on the one or more performance requirements for the first protocol and a maximum queuing delay imposed by other data traffic on the shared communication link.

In some embodiments, the method further includes establishing synchronization by the first device with the second device, establishing synchronization including transmitting a first symbol in a first time slot of each set of time periods until synchronization is detected, and transmitting a second symbol in the first time slot of each set of time periods after synchronization is detected.

In some embodiments, a method includes: establishing a time slot width for transmission of data traffic for a plurality of protocols including a first protocol over a shared communication link; allocating time slots for transmission of the plurality of protocols, wherein allocating time slots includes one or more of allocating a number of time slots assigned to each of the plurality of protocols and allocation a position of each of the time slots. In some embodiments, the first protocol includes one or more performance requirements, and the establishment of the time slot width and the allocation of the time slots are based at least in part on ensuring that operations of the first protocol meet the one or more performance requirements for the first protocol.

In some embodiments, the one or more performance requirements include one or more of a latency requirement, a bandwidth requirement, and a Quality of Service (QoS) requirement.

In some embodiments, a non-transitory computer-readable storage medium having stored thereon data representing sequences of instructions that, when executed by a processor, cause the processor to perform operations including: receiving data traffic for a plurality of protocols, including a first protocol, for transmission from a first device to a second device; dividing the data traffic for each protocol into portions that are no greater than an established number of bits for a time slot; inserting the portions of data for each of the plurality of protocols into time slots, wherein the time slots are allocated to each of the plurality of protocols for time division multiplexing of the data for each of the plurality of protocols; and transmitting data of each of the plurality of protocols over a shared communication link. In some embodiments, the first protocol includes one or more performance requirements, and wherein the allocation of the time slots within each of a plurality of sets of time periods to each protocol is based at least in part on ensuring that operations of the first protocol meet the one or more performance requirements for the first protocol.

What is claimed is:

1. An apparatus comprising:
   an interface for communication with a second apparatus, via a time division multiplexing protocol, the interface including a shared communication link; and
   a multiplexer to:
   determine a time slot width based on both a latency requirement of a first protocol of a plurality of protocols and a maximum queuing delay imposed, in part, by traffic of other protocols of the plurality of protocols, the time slot width being a number of bits;
   determine an allocation of time slots among the plurality of protocols to satisfy performance requirements of the first protocol, the performance requirements including the latency requirement of the first protocol; and
   multiplex data of each of the plurality of protocols into time slots for transmission based on the time slot width and the allocation of time slots.

2. The apparatus of claim 1, wherein the performance requirements of the first protocol include one or more of a bandwidth requirement and a Quality of Service (QoS) requirement.

3. The apparatus of claim 1, wherein determining the allocation of time slots comprises:
   determining a number of time slots, within a set of time slots, to allocate to the first protocol which will meet the performance requirements of the first protocol;
   allocating at least that number of time slots, within the set of time slots, to the first protocol.

4. The apparatus of claim 1, wherein determining the allocation of the time slots includes determining, based on the performance requirements of the first protocol, the allocation of a position of one more time slots.

5. The apparatus of claim 1, wherein the number of bits of the time slot width is one of a single bit for traffic of a first speed, a nibble for traffic of a second speed, or a byte for traffic of a third speed, where the first speed is slower than the second and third speeds and the third speed is faster than the first and second speeds.

6. The apparatus of claim 1, wherein the shared communication link is a bidirectional link including one or more wires or optical fibers.

7. The apparatus of claim 1, wherein the first protocol is USB™ (Universal Serial Bus) protocol.

8. The apparatus of claim 1, wherein the plurality of protocols includes USB and the shared communication link includes one or more conductors of a USB compatible connector.

9. The apparatus of claim 1, wherein the plurality of protocols includes USB 3.0 and the shared communication link includes one or more conductors of a USB 2.0 compatible connector.

10. The apparatus of claim 1, wherein the allocation of time slots includes allocation of time slots for packet communication in a first group and time slots including the first protocol in a second group.

11. The apparatus of claim 10, wherein the first group includes USB 3.0 packet communication and wherein the first protocol includes one or more of USB Low Speed, Full Speed, and High Speed traffic.

12. The apparatus of claim 1, wherein the first protocol is a protocol for a I²C serial bus.

13. The apparatus of claim 1, wherein the first protocol is a protocol for PCIe (Peripheral Component Interconnect Express).

14. The apparatus of claim 1, wherein the apparatus is enumerated as one more nodes in addition to nodes that are physically present.

15. A method comprising:
   receiving data traffic for a plurality of protocols, including a first protocol, for transmission from a first device to a second device;

determining a time slot width based on both a latency requirement of the first protocol and a maximum queuing delay imposed, in part, by traffic of other protocols of the plurality of protocols, the time slot width being a number of bits;

dividing the data traffic for each protocol into portions that are no greater than the time slot width;

determining an allocation of time slots within each of a plurality of sets of time periods among the plurality of protocols to satisfy one or more performance requirements of the first protocol, the performance requirements including the latency requirement of the first protocol; and inserting the portions of data for each of the plurality of protocols into time slots based on the allocation of time slots; and transmitting, via a time division multiplexing protocol, data of each of the plurality of protocols over a shared communication link.

16. The method of claim 15, wherein the one or more performance requirements include one or more of a bandwidth requirement and a Quality of Service (QoS) requirement.

17. The method of claim 15, wherein determining the allocation of time slots comprises:

determining a number of time slots, within a set of time slots, to allocate to the first protocol which will meet the one or more performance requirements of the first protocol;

allocating at least that number of time slots, within the set of time slots, to the first protocol.

18. The method of claim 15, wherein determining the allocation of the time slots to satisfy the one or more performance requirements for the first protocol constitutes determining an allocation of a position of one or more time slots.

19. The method of claim 15, further comprising establishing synchronization by the first device with the second device, establishing synchronization including transmitting a first symbol in a first time slot of each set of time periods until synchronization is detected, and transmitting a second symbol in the first time slot of each set of time periods after synchronization is detected.

20. A method comprising:

determining a time slot width based on both a latency requirement of a first protocol of a plurality of protocols and a maximum queuing delay imposed, in part, by traffic of other protocols of the plurality of protocols, the time slot width being a number of bits;

determining an allocation of time slots among the plurality of protocols to satisfy one or more performance requirements of the first protocol, the one or more performance requirements including the latency requirement of the first protocol; and insert data of each of the plurality of protocols into time slots for transmission from a first device to a second device based on the time slot width and the allocation of time slots.

21. The method of claim 20, wherein the one or more performance requirements include one or more of a bandwidth requirement and a Quality of Service (QoS) requirement.

22. A non-transitory computer-readable storage medium having stored thereon data representing sequences of instructions that, when executed by a processor, cause the processor to perform operations comprising:

receiving data traffic for a plurality of protocols, including a first protocol, for transmission, via a time division multiplexing protocol, from a first device to a second device;

determining a time slot width based on a latency requirement of the first protocol based on a maximum queuing delay imposed, in part, by traffic of other protocols of the plurality of protocols, the time slot width being a number of bits;

dividing the data traffic for each protocol into portions that are no greater than the time slot width;

determining an allocation of time slots within each of a plurality of sets of time periods among the plurality of protocols to satisfy one or more performance requirements of the first protocol, the performance requirements including the latency requirement of the first protocol; and inserting the portions of data for each of the plurality of protocols into time slots based on the allocation of time slots; and transmitting data of each of the plurality of protocols over a shared communication link.

* * * * *